United States Patent
Nordby

[19]
[11] Patent Number: 5,161,173
[45] Date of Patent: Nov. 3, 1992

[54] METHOD OF ADJUSTING THE PHASE OF A CLOCK GENERATOR WITH RESPECT TO A DATA SIGNAL

[75] Inventor: Rasmus Nordby, Horsholm, Denmark

[73] Assignee: NKT A/S NKT Alle, Denmark

[21] Appl. No.: 623,799

[22] PCT Filed: Jun. 23, 1989

[86] PCT No.: PCT/DK89/00157

§ 371 Date: Dec. 21, 1990

§ 102(e) Date: Dec. 21, 1990

[87] PCT Pub. No.: WO89/12936

PCT Pub. Date: Dec. 28, 1989

[30] Foreign Application Priority Data

Jun. 24, 1988 [DK] Denmark .................. 3486/88

[51] Int. Cl.$^5$ .................. H03D 3/24; H03K 9/06
[52] U.S. Cl. .................. 375/119; 375/120; 307/511; 328/133; 328/155
[58] Field of Search .................. 375/119, 120; 328/133, 328/155; 307/511

[56] References Cited

U.S. PATENT DOCUMENTS

| | | | |
|---|---|---|---|
| 3,803,492 | 4/1974 | Siglow et al. | 375/118 |
| 4,191,976 | 3/1980 | Braun | 375/120 |
| 4,527,277 | 7/1985 | Kosaka et al. | 375/120 |
| 4,535,459 | 8/1985 | Hogge, Jr. | 375/120 |
| 4,682,121 | 7/1987 | Chapman | 375/120 |
| 4,972,443 | 11/1980 | Sarkoezi | 375/119 |

FOREIGN PATENT DOCUMENTS

| | | |
|---|---|---|
| 0009939 | 4/1980 | European Pat. Off. |
| 27289 | 7/1983 | European Pat. Off. |
| 0168943 | 1/1986 | European Pat. Off. |
| 0266588 | 5/1988 | European Pat. Off. |
| 0270236 | 6/1988 | European Pat. Off. |

OTHER PUBLICATIONS

Patent abstract of Japan, vol. 6, No. 230, E142, Abstract of JP 57-131144, Publ Aug. 13, 1982 Nippon... Kosha.

*Primary Examiner*—Benedict V. Safourek
*Assistant Examiner*—Young Tse
*Attorney, Agent, or Firm*—Ladas & Parry

[57] ABSTRACT

In a method of adjusting the phase of a clock generator with respect to a data signal (50) an auxiliary signal (52) is generated by comparing the data signal (50) and a clock signal (51). The auxiliary signal (52) exhibits a disuniform representation corresponding to various data bit sequences. The data sequences are detected and combined with the auxiliary signal to generate a phase adjustment signal (54) with a uniform representation corresponding to the various data bit sequences and having an average value depending upon the phase difference between clock signal and data signal. Further, a reference signal (55) may be generated, representing the average value of the phase adjustment signal (54) which responds to ideal phase state. This reference signal (55) in combination with the phase adjustment signal (54) may be used for an even more precise adjustment of the phase of the clock generator with respect to the data signal.

7 Claims, 6 Drawing Sheets

METHOD OF ADJUSTING THE PHASE OF A CLOCK GENERATOR WITH RESPECT TO A DATA SIGNAL

BACKGROUND OF THE INVENTION

The invention concerns a method of adjusting the phase of a clock generator with respect to a data signal. More particularly, it concerns phase and frequency adjustment of a clock generator whose frequency is lower than that of the data signal.

To avoid external synchronization in demultiplexing of a serial data signal it is desirable to regenerate a clock signal on the basis of the incoming data stream. In this connection it is necessary to be able to relate the frequency and phase of the regenerated clock with respect to the data signal. This poses some problems if the bit pattern in the data signal is very irregular.

It is known from e.g. Engel Roza: "Analysis of Phaselocked Timing Extraction Circuits for Pulse Code Transmission", IEEE Transactions on Communications, COM-22, No. 9, p. 1236, September 1974 to regenerate a clock signal by means of analog processing of the incoming data signal. This analog processing consists of a non-linear signal processing with subsequent filtration. The method has the drawback that exact phase reference to data is lost. Further, the dimensioning of such an analog circuit is very complex, so this solution is also vitiated by lack of flexibility.

From EP-A-0 270 236 it is known to control the oscillator of the phase locked loop by detecting the phase difference between the clock signal and the data signal and generating a phase adjustment signal for the clock signal.

Figure 1:
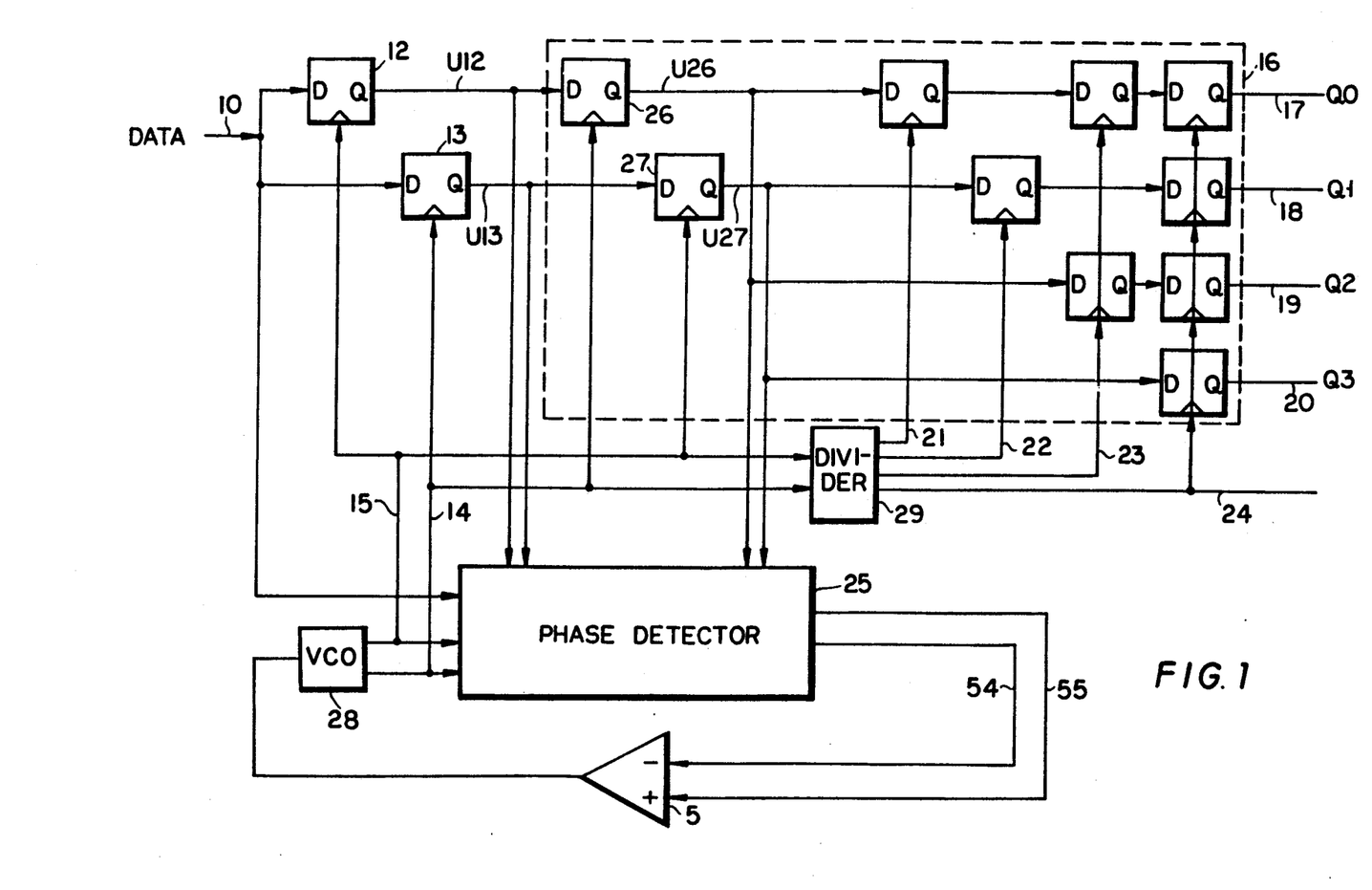
FIG. 1 shows the principle of a demultiplexer which operates when a maximum clock frequency half as great as the frequency of the data signal is used.

Further, in demultiplexing of a data signal, with a view to obtaining an operation frequency as high as possible for the demultiplexer, attention is paid to the implementation of the clock controlled elements since it is usually these which limit the rate. It is therefore preferred that clock controlled elements operate at a lower clock frequency than the data stream. This may be realized with a circuit known per se as shown in FIG. 1, where the first memory elements in the demultiplexer are clocked with a differential clock signal whose frequency is half as great as the frequency of the data signal. The two first memory elements are triggered by the positive clock phase and the negative clock phase, respectively, so that two successive data bits are clocked into their respective memory elements. Since the conversion rate of the demultiplexer is in principle limited by the working rate of the memory elements, this configuration in reality doubles the maximally obtainable rate with respect to the conventional method where the full clock frequency is regenerated. This parallel demultiplexing may moreover be extended to comprise e.g. four input memory elements which are triggered by clock signals with a frequency which is one fourth of the data frequency, the respective clock signals being mutually phase shifted 90°.

It is known from EP 0 027 289 to perform phase comparison between a data signal and a clock signal whose frequency is half as great as the frequency of the data signal. However, this known circuit is inexpedient since differentiation and rectification of the data signal are performed prior to the phase comparison, which involves uncertainty in the phase between the regenerated clock and the data signal. Moreover, the circuit comprises delay elements which are to delay the signal corresponding to a phase rotation of 90°, which either requires using a clock signal whose frequency is twice as great as the frequency of the data signal, or using a passive delay. The drawbacks of a clock signal having a high frequency are mentioned before, and the use of a passive delay entails that the circuit will be data frequency dependent.

The object of the invention is to provide a digital method in the adjustment of the phase difference of a regenerated clock frequency with respect to a data signal. It is desirable to provide a method entailing that the phase of the clock signal is related directly to the data signal, and where the frequency of the regenerated clock signal is preferably half the frequency of the data signal.

SUMMARY OF THE INVENTION

This object is achieved by generating an auxiliary signal by comparison of data signal and clock signal, said auxiliary signal exhibiting a non-uniform representation of the phase difference between the data signal and the clock signal corresponding to various data bit sequences; and detecting said various data bit sequences and combining them with the auxiliary signal to provide a phase adjustment signal with a uniform representation corresponding to the various data bit sequences. This provides a digital phase adjustment signal whose average value is an expression of the phase difference between the data signal and the clock signal, so that it may be used directly for adjustment of a voltage controlled oscillator.

When a reference signal, described hereinafter is combined with the phase adjustment signal, an improved phase adjustment signal will be obtained, which is directly proportional to the phase deviation from ideal phase, irrespective of the frequency of shifts between data bit sequences.

BRIEF DESCRIPTION OF THE DRAWING

Some preferred embodiments of the invention will be explained in more detail below with reference to the drawing, in which.

FIG. 1 shows a parallel demultiplexer of a type known per se where the invention can be used to advantage. A data signal with the frequency F is received on the input 10, and it clocked into two memory elements 12 and 13, which are triggered by the positive or the negative clock phase 14 or 15, respectively, of a differential clock signal whose frequency is F/2. This entails that two successive data bits are clocked into a respective memory element. The subsequent network of memory elements 16, which is triggered by the positive or the negative clock edge 14 or 15, respectively, or by one of the phases 21-24 in a clock signal with the frequency F/4 where the individual phases are mutually shifted 90°, provides for simultaneous accessibility of a plurality of bits Q0, Q1, Q2, Q3 on the outputs 17, 18, 19 and 20 where they are accessible in four data bit periods. The invention is concentrated on the phase detector 25 of the circuit, where the phase between the data signal and the differential clock signal is detected, as explained more fully below. The output signals 54 and 55 from this circuit are used via a differential amplifier 5 for adjusting a voltage controlled oscillator 28, which generates the differential clock signal 14 and 15. The differential amplifier 5 comprises low pass filters on both inputs, thereby averaging the signals.

Figure 2A:
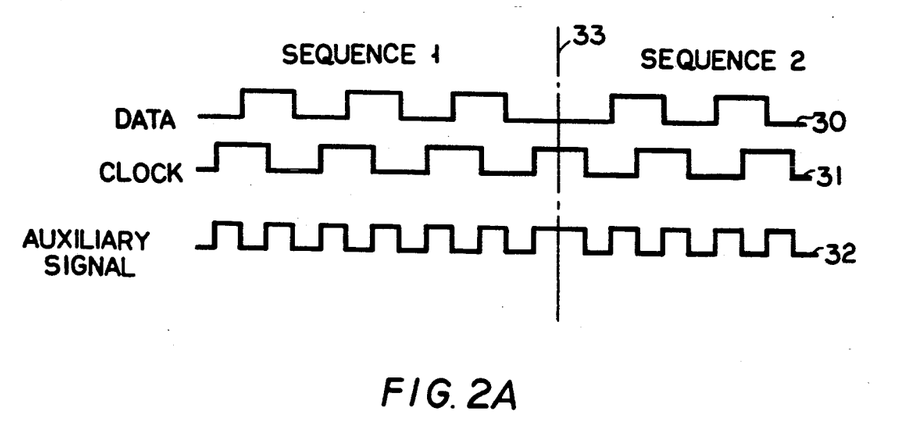
FIG. 2A shows the auxiliary signal when the phase difference between data and clock is ideal.

FIG. 2A shows a timing diagram where the frequency of the clock signal is half the frequency of the data signal, and where the phase between the data signals 30 and the differential clock signal 31 is ideal, i.e. shifts in the clock signal timewise take place halfway between shifts in the data signal. An auxiliary signal 32 is produced via an EXOR function between data signal and clock. It will be seen in the uniform bit pattern in the data signal that the average value of the auxiliary signal is ½, also after the time 33 where the data bit sequence shifts.

Figure 2B:
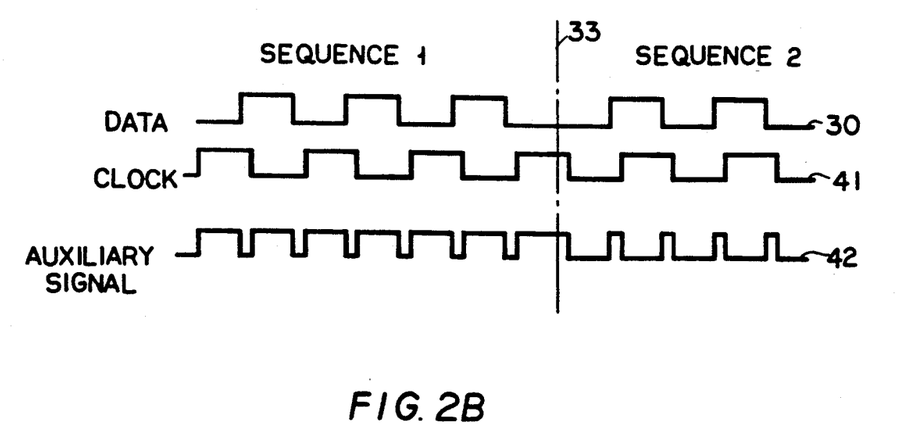
FIG. 2B shows the auxiliary signal when the phase difference between data and clock is critical.

FIG. 2B shows how the auxiliary signal is affected when the phase difference is not ideal. When the first data bit sequence is present, the average value of the auxiliary signal 42 will be greater than in an ideal phase difference, while the average value with the other data bit sequence will be smaller.

In periods with the same data bit sequence the auxiliary signal 42 is thus an expression of the phase difference, but the representation is mutually inverted in the two data bit sequences. The data bit sequences are therefore detected, which in combination with the auxiliary signal may be used for generating an unambiguous phase adjustment signal.

Figure 3:
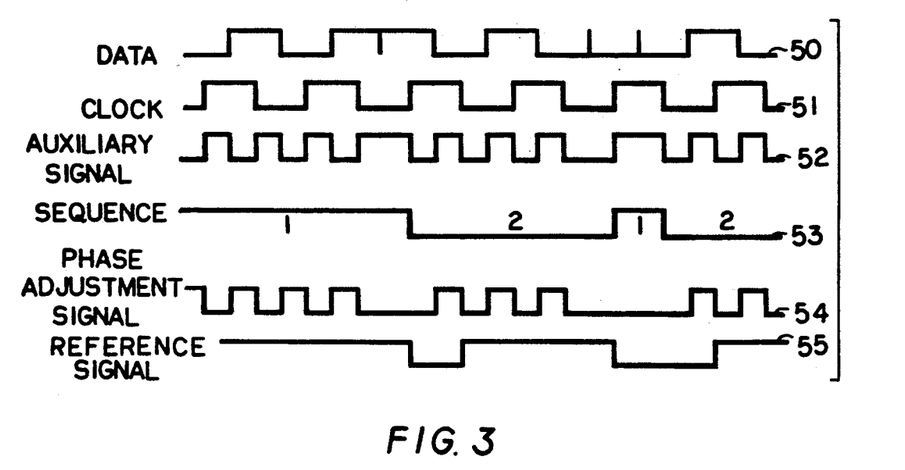
FIG. 3 shows a timing diagram for generating auxiliary signal, detection of data bit sequences and generation of phase adjustment signal and reference signal.

FIG. 3 shows a timing diagram of the invention where the shifts between data bit sequences are closer, and where the phase difference is ideal. The signal sequence 53 indicates which data bit sequence is received at a given time. One data bit sequence is characterized in that data bits are low at a rising clock edge and high at a falling clock edge, while the other data bit sequence is characterized in that data bits are high at a rising clock edge and low at a falling clock edge. The phase adjustment signal 54 is produced by inverting the auxiliary signal 52 when the first data bit sequence is present, while it is not inverted when the second data bit sequence is present. The average value of the phase adjustment signal 54 is proportional to the phase difference between the data signal 50 and the clock signal 51, but, as will be seen, it is also proportional to $(1-H)$, where H is the frequency of shifts between data bit sequences.

Consequently, a reference signal 55 is produced, whose average value is proportional to the average value of the phase adjustment signal 54 in case of an ideal phase. When this reference signal 55 is combined with a phase adjustment signal 54, the result will be a differential signal which is an unambiguous expression of the phase shift from ideal phase. The actual reference signal 55 is produced on the recognition that a shift in data bit sequence may be recognized in that two successive data bits have the same logic level, and that shifts in data bit sequence will cause lacking information in the phase adjustment signal 54. The reference signal is therefore produced in that the signal assumes one logic level for a predetermined period which is smaller than or equal to the duration of a data bit when two successive data bits have the same logic level, and assumes another logic level for the rest of the time. The average value of the reference signal will thus be proportional to $(1-H)$ where H is the frequency of shifts between data bit sequence.

Figure 4:
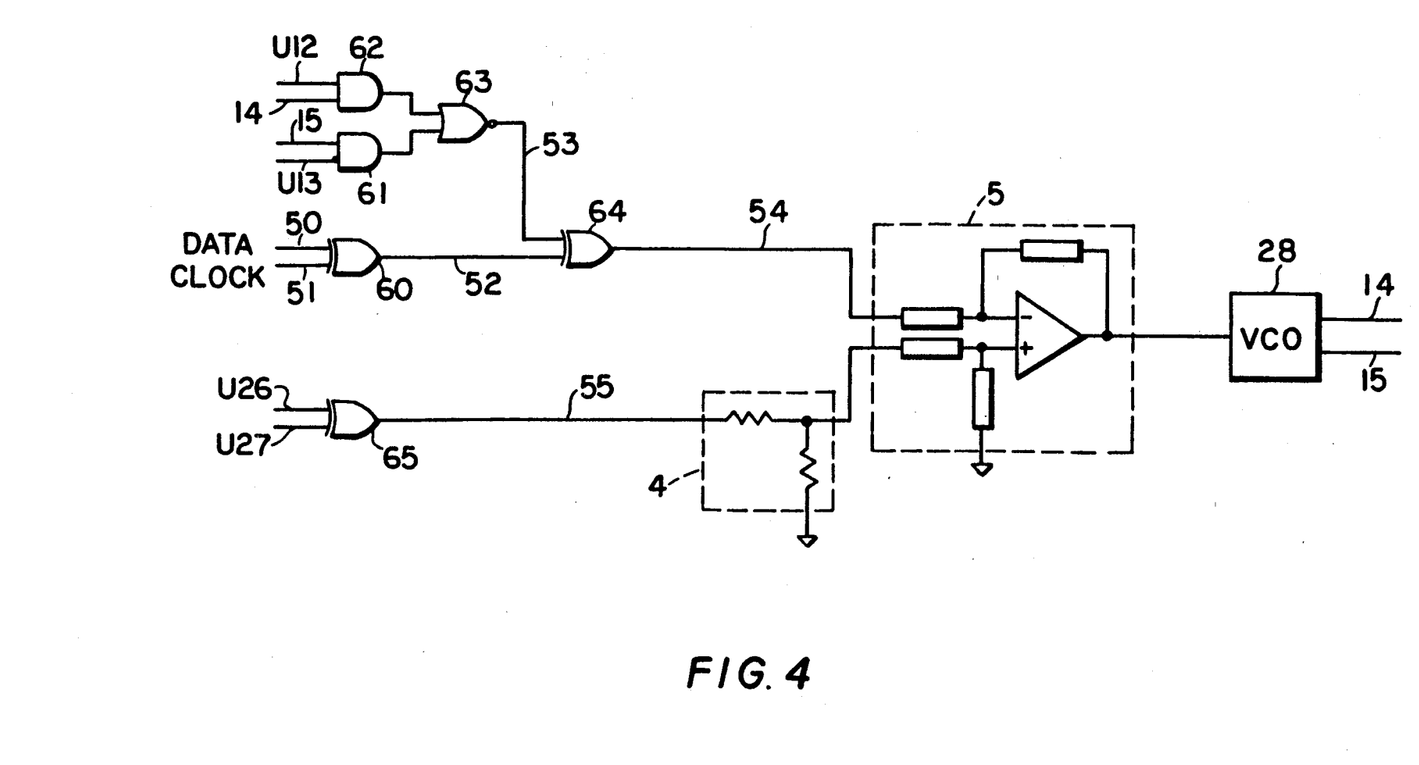
FIG. 4 shows a preferred embodiment of the logic circuit for realization of the invention when the clock frequency is half the frequency of the data signal.

FIG. 4 shows a preferred embodiment of the invention. The auxiliary signal 52 is generated by means of an EXOR gate 60 by an EXOR function between data signal 50 and clock signal 51. The data bit sequences are detected with the AND gates 61 and 62 combined with a NOR gate 63. AND gate 62 detects when the negative clock phase 15 triggers a low data bit into the memory element 12, and AND gate 61 detects when the positive clock phase 14 triggers a high data bit into the memory element 13. These two states entail that the second data bit sequence is present, so a NOR function (performed in the NOR gate 63) will produce a signal which is high when the first data bit sequence is present, and low when the second data bit sequence is present (a signal corresponding to the sequence 53 in FIG. 3). The phase adjustment signal 54 is produced by an EXOR function (performed in the EXOR gate 64) between the sequence signal 53 from the gate 63 and the auxiliary signal 52 from the gate 60. The reference signal 55 is produced by an EXOR function (performed in the EXOR gate 65) between output signals from the memory elements 26 and 27, U26 and U27, said output signals representing two successive data bits. Thus, the reference signal will be high when successive data bits differ, corresponding to two data bits belonging to the same data bit sequence. In case of shifts in data bit sequence two successive data bits will be uniform, which gives a low level on the reference signal 55 for half a clock period at the frequency F/2. The reference signal 55 is normalized by means of a voltage divider 4 so that the amplitude fits with the phase adjustment signal 54 before these signals, via the differential amplifier 5, are used for controlling a two-phased voltage controlled oscillator If the amplitude of the output voltage for the logic gates is uniform, the signal 87 is to be divided by two in the voltage divider 4.

Figure 5:
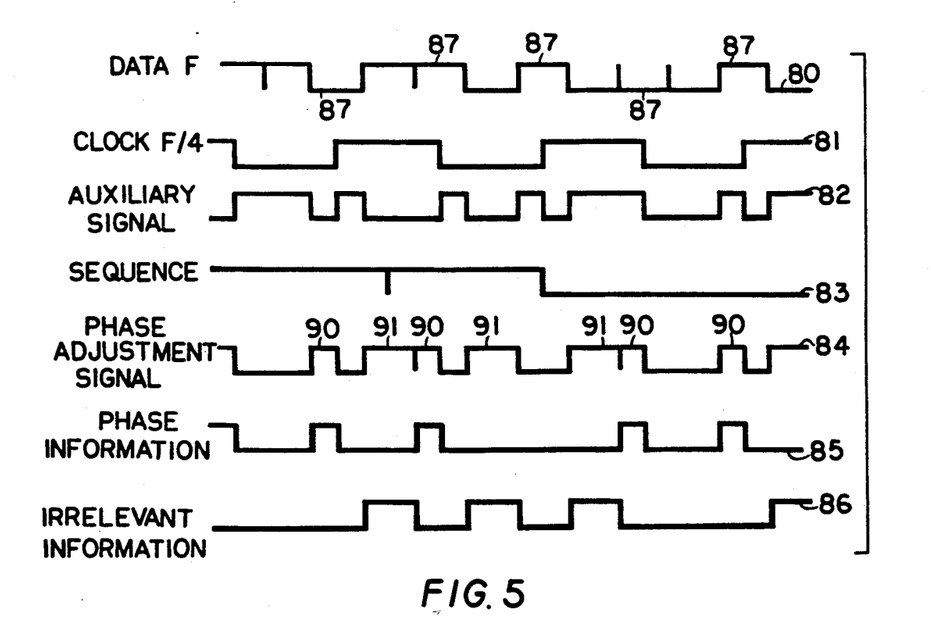
FIG. 5 shows a timing diagram of an embodiment of the invention where the clock frequency is one fourth of the frequency of the data signal.

FIG. 5 shows a timing diagram which illustrates an embodiment of the invention for implementation in a circuit where it is desired to phase adjust a clock signal whose frequency is one fourth of the frequency of the data signal. Like before, the auxiliary signal is generated by an EXOR function between a phase of the clock signal with a frequency F/4 and the incoming data signal with a frequency F. The data bit sequences are detected according to the same criteria as before, i.e. in response to the logic level on the data bit represented on the input when a shift takes place in the clock signal. Since the clock frequency is F/4, it is only every other data bit 87, called detection bit hereinafter, which contributes with phase information, and which decides which data bit sequences are detected. The sequence 83 is combined with the auxiliary signal 82, like before, in that the auxiliary signal is inverted in response to the actual data bit sequence. This provides a phase adjustment signal 84 which, in addition to unambiguous phase information 90, also contains irrelevant information 91 originating from the data bits which are not used for detecting the data bit sequence. In the period of irrelevant information 91 the phase adjustment signal assumes a logic high value when the data bit following a detection bit 87 has a logic level different from the logic level of the detection bit in question. Correspondingly, the phase adjustment signal assumes a logic low value when the data bit following a detection bit 87 has a logic level corresponding to the logic level of the detection bit in question. The duration of the irrelevant information is equal to the duration of a data bit.

Similar to the description of FIG. 3, a reference signal is generated whose average value is proportional to the average value of the phase adjustment signal in case of ideal phase. This reference signal consists of the sum of two contributions. The first contribution 85 is proportional to (1−H) where H is the frequency of shifts between data bit sequences. The average value of the second contribution 86 is proportional to the average value of the irrelevant information 91, which is also contained in the phase adjustment signal 84. This entails that the average value of the reference signal is proportional to the average value of the phase adjustment signal in case of ideal phase difference, indendent upon data bit sequence and value of non-detection bits.

Figure 6:
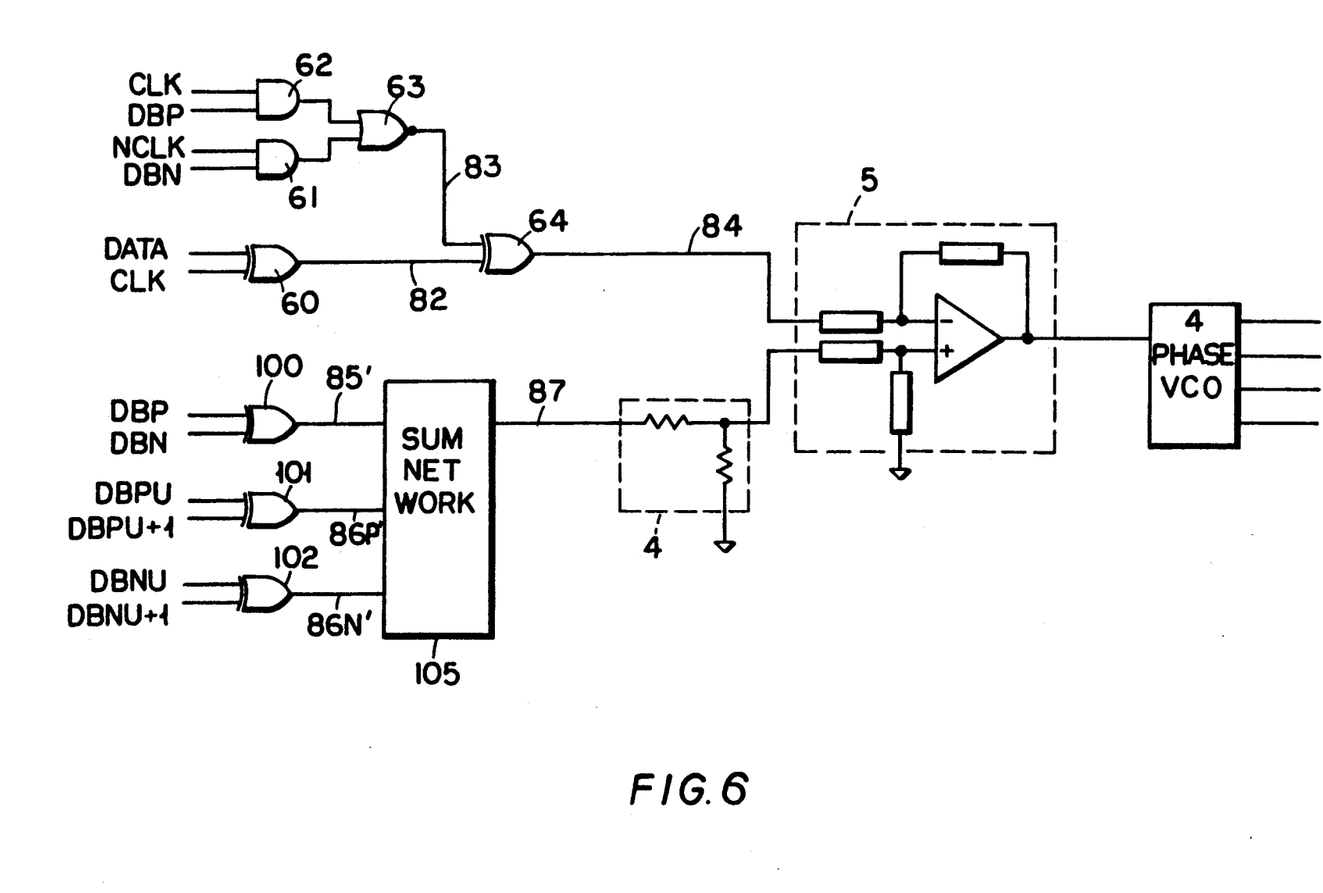
FIG. 6 shows a circuit of the invention for using a clock frequency which is one fourth of the frequency of the data signal.

FIG. 6 shows a preferred embodiment of a circuit for phase adjusting a clock signal whose frequency is one fourth of the frequency of a data signal. The generation of the auxiliary signal 82, the sequence signal 83 and the phase adjustment signal 84 is effected with a circuit corresponding to the one shown in FIG. 4, and these signals therefore correspond to the signals 52, 53 and 54 in FIG. 4. The input signals for this part of the circuit are the incoming data signal DATA, two phases of the four-phased clock signal, viz. CLK and the NCLK shifted 180°, the output signal DBP from the memory element where the positive clock signal CLK clocks a detection bit, and finally the output signal DBN from the memory element where the negative clock signal NCLK clocks a detection bit.

The reference signal 87 is generated by using the signals DBP and DBN as well as four parallel output signals DBPU, DBPU+1, DBNU and DBNU+1 from the demultiplexer, said output signals being accessible at the same time and accessible for a whole clock period. DBP and DBN are also separately accessible for a whole clock period, but are mutually time shifted half a clock period. The EXOR function in gate 100 between these two signals results in a signal 85' which is proportional to the ideal phase information 85, since the signal 85' is high when two successive detection bits DBP and DBN are different. The EXOR function in the gate 101 between DBPU and DBPU+1 results in a signal 86P' which is proportional to the irrelevant information occurring when the data bit immediately after a detection bit clocked by the positive clock signal CLK has another logic level than the associated detection bit. Likewise, the EXOR function in the gate 102 between DBNU and DBNU+1 results in a signal 86N' which is proportional to the irrelevant information occurring when the data bit immediately after a detection bit clocked by the negative clock signal =NCLK has another logic level than the associated detection bit. Thus, a sum function in the sum network 105 provides a reference signal 87 which is proportional to the phase adjustment signal 84 in case of ideal phase. The signal 87 is normalized in the following voltage divider 4 so that the amplitude fits with the phase adjustment signal 84 before these signals, via the differential amplifier 5, is used for controlling a four-phased voltage controlled oscillator. If the amplitude of output voltage for the logic gates is uniform, the signal 87 is to be divided by four in the voltage divider 4.

Figure 7:
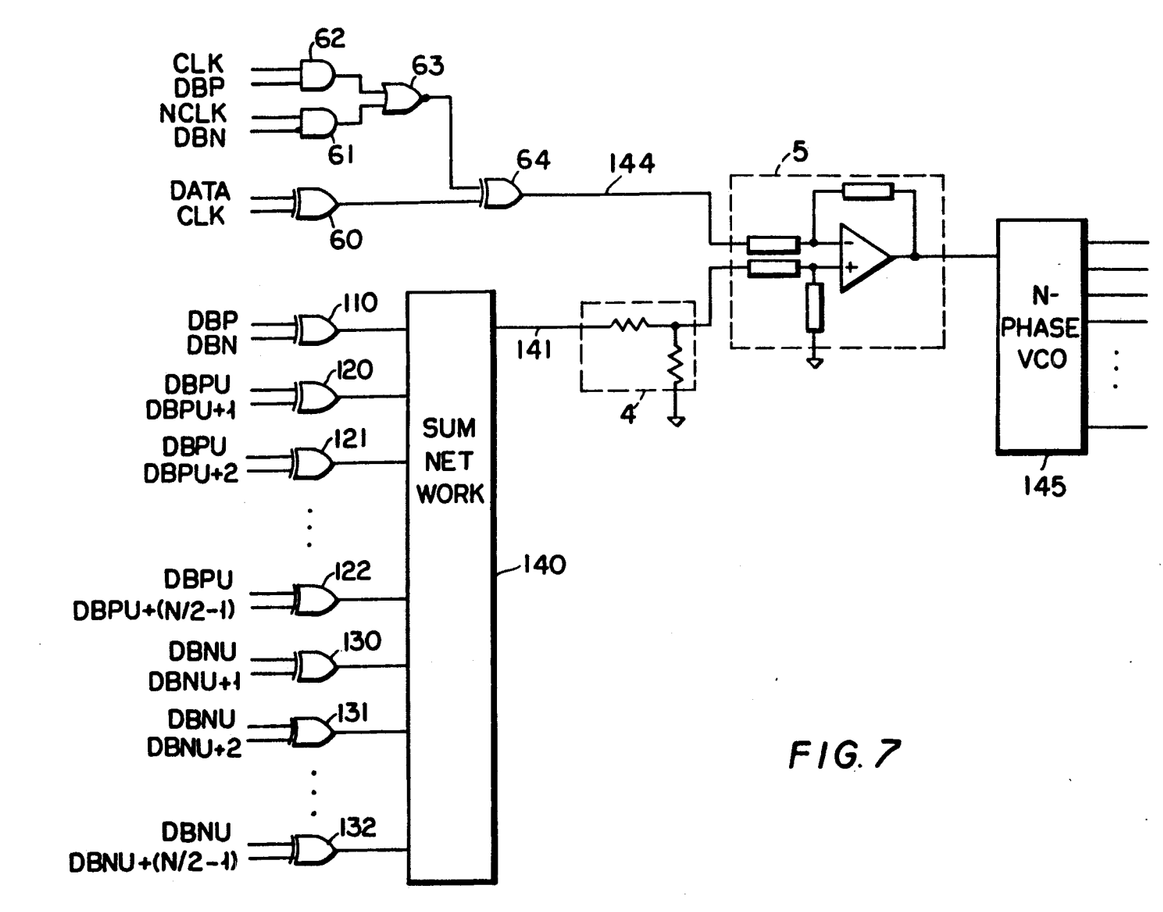
FIG. 7 shows a general circuit according to the invention.

FIG. 7 shows a general embodiment of the invention for use in a parallel demultiplexer, where the frequency of the incoming data signal is a multiple of twice the frequency of the clock signal, i.e.

*clock frequency=data frequency/N, where N=2, 4, 6, 8 ...*

The phase adjustment signal 144 is produced with a circuit corresponding to the one used for producing the phase adjustment signal 84 in FIG. 6, and the input signals are defined in the same manner.

Like in gate 100 in FIG. 6, a signal is produced by the EXOR function in the gate 110 by means of two successive detection bits, DBP and DBN, said signal being proportional to the phase information in the phase adjustment signal in case of ideal phase. The other EXOR gates 120, 121 ... 122, 130, 131 ... and 132 generate signals which, by summation in the sum network 140, result in a signal which is proportional to the irrelevant information. The individual signals are generated by means of the output signals of the demultiplexer, it being assumed that N-signals are accessible at the same time in a clock period. The first output signal DBPU: detection bit clocked by the positive clock signal is thus followed by (N/2−1) non-detection bit, DBPU+1, DBPU+2 ... and DDBPU+(N/2−1), where DBPU is compared with the respective non-detection bits in the EXOR gates 120, 121 ... and 122, thereby generating for each non-detection bit whose logic level differs from the logic level of the associated detection bit DBPU a signal which corresponds to the possible irrelevant information which the nondetection bit in question has caused. Correspondingly, signals are generated in the EXOR gates 130, 131 ... and 132 in proportion to the irrelevant information generated by the non-detection bits DBNU+1, DBNU+2 ... and DBNU+(N/2−1), and these output signals are compared with the associated detection bit DBNU. The summed reference signal 141 from the sum network 140 is thus proportional to the phase adjustment signal 144 in case of ideal phase difference, and the reference signal 141 is normalized in the voltage divider 4 with respect to the phase adjustment signal 144. If the amplitude of the output voltages for the logic gates is uniform, the reference signal 141 is to be divided by N in the voltage divider 4. The normalized reference signal from the voltage divider is combined with the phase adjustment signal in the differential amplifier 5 and is used for controlling an N-phased voltage controlled oscillator 145.

I claim:

1. A method of adjusting the phase of a clock signal with respect to the phase of a data signal presenting data in the form of alternating first and second sequences of data bits, said first data bit sequence having data bits that are low at a rising edge of a clock pulse of said clock signal and high at a falling clock pulse edge, while said second data bit sequence has data bits that are high at a rising clock pulse edge and low at a falling clock pulse edge, the method comprising:

generating an auxiliary signal in response to comparing said data signal with said clock signal, said auxiliary signal exhibiting different representations of the phase difference between said data signal and said clock signal dependent upon the particular data bit sequence being compared;

generating a sequence signal responsive to and indicating the particular data sequence being presented by said data signal; and comparing said sequence signal and said auxiliary signal to generate an actual phase adjustment signal exhibiting the same representation of the phase difference between said data signal and said clock signal for both data bit sequences and having an average value depending on the phase difference between said clock signal and said data signal.

2. A method according to claim 1 wherein said auxiliary signal comprises a series of data bit pulses, and the step of generating said actual phase adjustment signal comprises generating a series of data bit pulses in response to the auxiliary signal pulses, the logic levels of the pulses in said phase adjustment signal being in phase with the logic levels of the bit pulses in said auxiliary signal when one of said data bit sequences is present and out of phase when the other of said data bit sequences is present.

3. A method according to claim 1 comprising generating the auxiliary signal by an exclusive-or-operation between the data signal and the clock signal.

4. A method according to claim 1, comprising generating an ideal reference signal which represents the average value of a phase adjustment signal which would be generated in an ideal phase situation where shifts in the clock signal timewise take place halfway between shifts in the data signal, and combining said reference signal with said actual phase adjustment signal to generate a differential signal indicative of the phase difference actually present between said clock signal and said data signal.

5. A method according to claim 4, where the frequency of the clock signal is half the frequency of the data signal, and including the steps of generating the reference signal so that the reference signal has one logic level during a predetermined period which is smaller than or equal to the duration of one data bit of the data signal when two successive data bits have the same logic level, and has another logic level for the rest of the time.

6. A method according to claim 4, where the frequency of the data signal is an even multiple of the frequency of the clock signal, where data bits arriving while the clock signal changes logic level are defined as detection bits, and where the data bits arriving between two successive detection bits are defined as a packet of non-detection bits associated with the immediately preceding detection bit, including generating the reference signal by combining the following signals:

a first signal which has a first logic level during a predetermined period which is smaller than or equal to the duration of half a clock period when the two last-incoming detection bits have a different logic level, and which has a second logic level for the rest of the time, and a second signal which, for a predetermined period smaller than or equal to a whole clock period, has a value proportional to a plurality of non-detective bits in the predetermined period, said non-detection bits having a logic level different from the logic level of the detection bit associated with the packet.

7. A method according to claim 4, where the frequency of the clock signal is half the frequency of the data signal, and where the frequency of the clock signal is controlled by means of the phase adjustment signal in a phase-locked loop by using the reference signal for adjusting the loop gain in the phase-locked loop.

* * * * *